(12) United States Patent
Maryka et al.

(10) Patent No.: US 7,954,050 B2
(45) Date of Patent: May 31, 2011

(54) SYSTEMS AND METHODS FOR RENDERING AND INCREASING PORTABILITY OF DOCUMENT-BASED USER INTERFACE SOFTWARE OBJECTS

(75) Inventors: Stephen Maryka, Calgary (CA); Ted Goddard, Calgary (CA); Michael Beauregard, Calgary (CA)

(73) Assignee: Icesoft Technologies Canada Corp., Calgary, Alberta (CA)

( * ) Notice: Subject to any disclaimer, the term of this patent is extended or adjusted under 35 U.S.C. 154(b) by 937 days.

(21) Appl. No.: 10/877,461

(22) Filed: Jun. 25, 2004

(65) Prior Publication Data

US 2005/0289156 A1 Dec. 29, 2005

(51) Int. Cl.
*G06F 17/00* (2006.01)
(52) U.S. Cl. ............ 715/234; 715/235; 715/239
(58) Field of Classification Search .......... 715/513, 715/530, 234–236, 239, 200; 709/203
See application file for complete search history.

(56) References Cited

U.S. PATENT DOCUMENTS

| 6,675,230 | B1 | 1/2004 | Lewallen |
| 6,745,208 | B2 * | 6/2004 | Berg et al. ............... 1/1 |
| 7,712,025 | B2 * | 5/2010 | Roessler ............ 715/234 |
| 2002/0143859 | A1 | 10/2002 | Kuki et al. |
| 2003/0088421 | A1 * | 5/2003 | Maes et al. ........... 704/270.1 |
| 2003/0184585 | A1 | 10/2003 | Lin et al. |
| 2004/0002987 | A1 | 1/2004 | Clancy et al. |
| 2004/0103141 | A1 * | 5/2004 | Miller et al. ........... 709/203 |
| 2004/0103373 | A1 * | 5/2004 | Wei ................ 715/513 |
| 2004/0123239 | A1 * | 6/2004 | Roessler ............ 715/513 |
| 2005/0044145 | A1 * | 2/2005 | Quinn et al. ........... 709/205 |
| 2005/0086608 | A1 * | 4/2005 | Roessler ............ 715/764 |
| 2006/0200535 | A1 * | 9/2006 | Moser ................ 709/217 |

FOREIGN PATENT DOCUMENTS

| EP | 0 820028 | 1/1998 |
| EP | 0 833260 | 4/1998 |
| EP | 1 022664 | 7/2000 |

(Continued)

OTHER PUBLICATIONS

International Search Report for EPO 05756673.9-2201, dated Jul. 2, 2007 (7 pages).

(Continued)

*Primary Examiner* — Thu Huynh
(74) *Attorney, Agent, or Firm* — Arent Fox LLP

(57) ABSTRACT

Systems and methods for rendering document-based user interface software objects are disclosed. User interface software objects may be represented in a document object model on a first computer system. These objects may then be communicated to a second computer system on which they are similarly rendered through use of a document object model on a second computer system. A document on a first computer system may also be updated to reflect either user input through a user interface software object included in the document, or changes induced by server side logic. The updates may be incrementally communicated to and rendered in a second computer system. Location-neutral user interface software objects may be developed without regard to whether the software object will ultimately reside on a client or server computer system, wherein the user interface software object is equally capable of being supported on either one of a client or server computer system.

12 Claims, 6 Drawing Sheets

FOREIGN PATENT DOCUMENTS

| | | |
|---|---|---|
| EP | 1 221661 | 7/2002 |
| EP | 1 406183 | 4/2004 |
| WO | WO 01/57718 | 8/2001 |
| WO | WO 02/19131 | 3/2002 |
| WO | WO 02/39268 | 5/2002 |
| WO | WO 02/080016 | 10/2002 |
| WO | WO 02/091197 | 11/2002 |
| WO | WO 03/067469 | 8/2003 |
| WO | WO 03/083706 | 10/2003 |
| WO | WO 2004/031984 | 4/2004 |

OTHER PUBLICATIONS

Supplemental International Search Report for EPO 05756673.9-2201, dated Sep. 11, 2007 (7 pages).

Lauren Woods, "Programming the Web: The W3C DOM Specification" IEEE Internet Computing, Jan. 1999 pp. 48-54.

International Business Machines Corp. Web browser controller to access and show webpages for another unattended web browser: Research Disclosure, Mason Publications, vol. 451, No. 133, Nov. 2001, (1 page).

* cited by examiner

SYSTEMS AND METHODS FOR RENDERING AND INCREASING PORTABILITY OF DOCUMENT-BASED USER INTERFACE SOFTWARE OBJECTS

BACKGROUND

1. Field

This disclosure relates to computer programming in a World Wide Web environment and, more specifically, to systems and methods relating to a component oriented software design approach in a document oriented user interface environment.

2. Background

Current technologies for developing World Wide Web-related software applications can pose significant challenges to programmers. Such challenges concern interoperability, usability and maintainability. World Wide Web-related applications often require a document-oriented approach to designing user interfaces, while other types of software applications often require a component-oriented design approach. As will be explained below, document-oriented programming and component-oriented programming follow different, and sometimes conflicting, procedures.

The World Wide Web ("Web") includes a system of Internet servers that support specially formatted documents. The documents are often called "Web pages." Every Web page is identified by a unique Uniform Resource Locator ("URL"). Web pages are typically created in a "mark-up" computer language, such as HyperText Mark-up language ("HTML"), Extensible Mark-up Language ("XML") or the like, that supports links to other documents, graphics, audio, and video files. A "mark-up language" is a computer language that describes how a page should be formatted by using specialized "tags." An HTML tag is a code element that tells a Web browser what to do with text. Mark-up languages also enable a person accessing content on the Web to jump from one document to another simply by clicking on links that are embedded within Web pages. Specialized software applications called Web browsers ("browsers") allow users to access the Web, and to retrieve and interact with documents on it. Browsers are typically capable of parsing HTML and retrieving Web pages using Hypertext Transfer Protocol ("HTTP"), File Transfer Protocol ("FTP"), and other protocols used to transfer information over networks. Two popular browsers are NETSCAPE NAVIGATOR and MICROSOFT INTERNET EXPLORER. Both are graphical browsers, meaning they can display graphics as well as text. To display graphics, such as images, software objects, and the like, the browser must be able to "render" the graphic. A Web browser is able to interpret the set of mark-up language tags within a page in order to display the page on your screen as the page's creator intended it to be viewed. Unfortunately, presenting certain types of information, and supporting certain interactions with a document pose challenges to the traditional rendering processes.

Software applications and documents that are accessible on the Web are often constructed from a set of software components, in accordance with a component software development paradigm. A "component" is typically a small binary object or program that performs a specific function. It is often designed in such a way as to easily operate with other components and applications. A set of interacting components may constitute a software application. The user interface for a software application may be implemented with UI components that include a visual representation and control element that handles interactions between the component's representation and the user. Certain classes of UI components may also be represented in documents that are available via the Internet. Thus, when a user accesses a Web page or other document with his browser, the browser renders the visual representation of each component contained in the document so that the components can be displayed to the user. Components may include controls that a user can interact with, such as tables, text boxes, and other user-interactive items. A control is typically a software-based item that can be individually selected and manipulated by a user.

Typically, Web pages are stored on large server machines. These machines may be accessed by individuals operating smaller client machines such as personal computers. When a user accesses a server Web page through a browser installed on his client machine, the browser typically retrieves the page from the server, and renders the page on the user's own client machine, so that the page can be viewed by the user. If the Web page comprises component representations, each component must be rendered by the browser. However, when a Web page includes component representations that a user can interact with, rather than merely static information, the content on a page may undergo changes after the page and its component representations have been displayed to the user. For example, a Web page may include a table component. Whenever the user interacts with a component representation in the server Web page, such as by manipulating data in the table, that component's state must be updated to reflect this interaction. The state change in the component could trigger addition state changes that must be ultimately reflected in the component representation on the user's display screen. These changes need to be shown to the user, but are often difficult to coordinate on an on-going basis, as a user continues to interact with the component, and component state changes are communicated back to the server. Currently, many Web applications rely on fetching from the server, in the form of mark-up language strings, then re-rendering an entire document upon every significant user event. Due to network latency and inherent rendering time, even the simplest updates to a component can cause significant inefficiencies and delays. Also, side effects from the delays including lost input focus and scrollbar position between page refreshes can occur during re-rendering. These can lead to reduced usability from a user's perspective. The process of converting components to mark-up language strings before rendering them, as well as the process of re-rendering an entire Web page upon user-interaction with only one component or portion of that page, can be tedious, cumbersome and time consuming. Furthermore, business logic state changes at the server that cause state changes in UI components cannot be asynchronously communicated to the component representation, and can only be realized when the page is refreshed after some user interaction with the component representation at the client.

In order to reduce the need for interacting with server-based documents and engage in time-consuming re-rendering, some Web applications have been designed to extend client-side capabilities so that updates may occur on the client itself. Specialized programming languages such as Dynamic HTML ("DHTML") and JavaScript enable some degree of client-side operability. DHTML refers generally to Web content that is capable of being changed while it is being viewed. JavaScript is a programming language technology, called a scripting language, for manipulating DHTML. JavaScript enables Web authors to design interactive Web sites that include controls with which users interact. JavaScript can interact with HTML source code, enabling Web authors to enhance Web pages with dynamic interactive state. While usability of client-side Web applications may be improved through the use of DHTML and JavaScript, interoperability and maintenance of such Web applications have often been impeded by such methods. One reason for this is that JavaScript is not inherently portable. As a result, incompatibilities between different machines in communication with one another can manifest when components within a document or application break down. For example, different software vendors often employ incompatible standards for JavaScript execution, and a single vendor may often support different JavaScript versions. One result of these incompatibilities is that JavaScript code relies on customized code for each combination of supported browser vendor and software version, and often cannot be easily maintained on a client machine. A Web application may be rendered completely unusable when a single component fails to operate due to an incompatibility.

In short, programmers can currently face significant challenges when designing user interfaces for component-based applications created for a networked Web-like environment. The ability to efficiently render updated versions of component-based applications and documents following user input to a user interface to those applications and documents is often significantly limited.

SUMMARY

In one aspect of the present invention, computer-readable media embodies instructions executable by a first computer system that cause the first computer system to perform a method of rendering a document-based user interface software object. The method includes representing the document-based user interface software object in a document object model that comprises a data structure for representing documents in the first computer system, translating the document object model, including the representation of the document-based user interface software object, into computer-readable characters, and transmitting the computer-readable characters to a second computer system.

In another aspect of the present invention, a method of rendering a document-based user interface object includes storing a document-based user interface object in a computer system, storing a document object model, that comprises a data structure for representing documents, in the computer system, and representing the document-based user interface object in the document object model in the computer system.

In a further aspect of the invention, a computer server system includes a memory system configured to include a document object model that comprises a data structure for representing documents on the computer server system, and a processing system configured to communicate with the memory system and with a client computing system. The processing system is also configured to (a) receive information, from the client computing system or from the server system, that causes a change to the document object model, (b) identify the change to the document object model, and (c) communicate the identified change to the client computing system.

In still another aspect of the invention, a computer system includes a first computing system configured to communicate with a second computing system, a memory device connected to the first computing system and configured to store a first document object model that comprises a data structure for representing documents on the first computing system, wherein the first document object model comprises a replication of a second document object model that is resident on the second computing system, and a processor connected to the first computing system and configured to receive input from either the first or the second computing system, wherein the input represents a change in the first document object model detected by the second computing system. The processor is additionally configured to represent the received input in the first document object model.

In yet another aspect of the invention, a method of developing and deploying a location-neutral document object model-based user interface software object, that is capable of being supported separately by each one of a client and a server, and that is capable of being represented in a document object model, includes developing software code to implement the location-neutral document object model-based user interface software object, wherein the development occurs in a manner that is not a function of whether the code will be deployed on a client computer system or a server computer system, deciding whether the software object code will be deployed on a client computer system or a server computer system, and deploying the software object code on a type of computing system on which the software object code was decided to be deployed. The location-neutral document object model-based user interface software object is capable of being supported separately by each one of a client computer system and server computer system and is capable of being represented in a document object model on the computing system on which the software object code was deployed.

In a further aspect of the invention, a method of programming a Web application having a location-neutral document object model-based user interface software object includes assembling a plurality of software objects to create a software application, wherein one of the plurality of software objects comprises the location-neutral document object-based user interface software object that is capable of being deployed on both a client computing system and a server computing system and is capable of being represented in a document object model.

It is understood that other embodiments of the specific teachings herein will become readily apparent to those skilled in the art from the following detailed description, wherein it is shown and described only several embodiments of the teachings by way of illustration. As will be realized, the subject matter of the teachings herein is capable of other and different embodiments and its several details are capable of modification in various other respects, all without departing from the spirit and scope of these teachings. Accordingly, the drawings and detailed description are to be regarded as illustrative in nature and not as restrictive.

BRIEF DESCRIPTION OF THE DRAWINGS

Aspects of the disclosures herein are illustrated by way of example, and not by way of limitation, in the accompanying drawings, wherein.

DETAILED DESCRIPTION

The detailed description set forth below in connection with the appended drawings is intended as a description of various embodiments of the teachings herein and is not intended to represent the only embodiments in which the teachings herein may be practiced. The detailed description includes specific details for the purpose of providing a thorough understanding of the teachings. However, it will be apparent to those skilled in the art that the teachings herein may be practiced without these specific details. In some instances, well-known structures and devices are shown in block diagram form in order to avoid obscuring the concepts of the teachings herein. Acronyms and other descriptive terminology may be used merely for convenience and clarity and are not intended to limit the scope of the teachings herein.

In the following detailed description, aspects of the teachings herein will be described in the context of a document object model. While these inventive aspects may be well suited for use with the W3C DOM, which will be explained in further detail below, those skilled in the art will readily appreciate that they are likewise applicable for use in various other document object models. Accordingly, any reference to a document object model is intended only to illustrate various aspects of the disclosures herein, with the understanding that such aspects have a wide range of applications.

Figure 1:
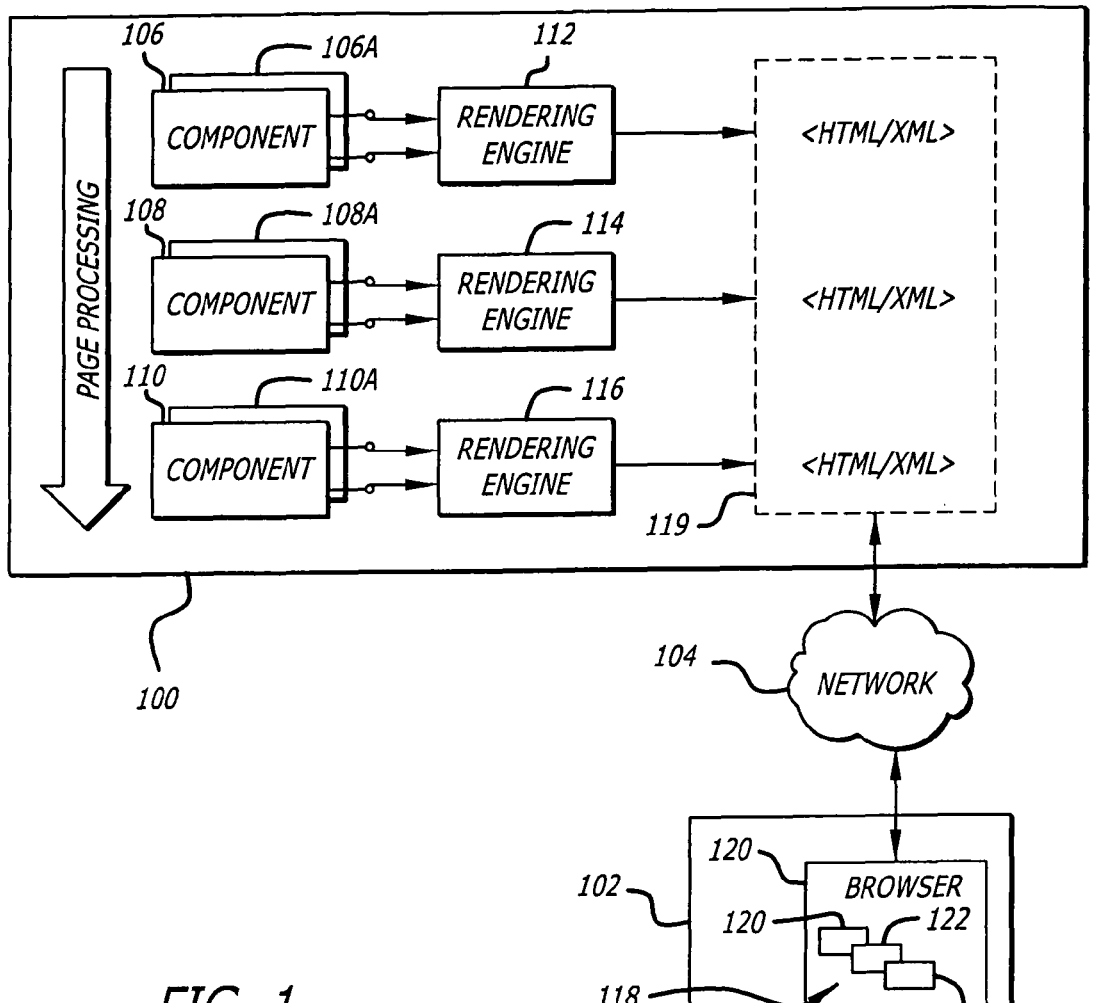
FIG. 1 is a conceptual block diagram of a prior art system for updating server components displayed in a web page on a client within a client-server architecture.

As described above, Web pages are typically stored on large server machines, which may be accessed by individuals operating smaller client machines such as personal computers. When a user accesses a server Web page through a browser installed on his client machine, the browser typically retrieves the page from the server, and renders the page on the user's own client machine, so that the page can be viewed by the user. If the Web page comprises software component representations, each component representation must be analyzed and rendered by the browser. FIG. 1 is a conceptual block diagram of a prior art system for updating component representations in a web page that is stored on a server and rendered on a client within a client-server architecture. A server 100 is communicatively connected to a client 102 via a communications network 104, such as the Internet. A Web page stored on the server 100 may include one or more components 106, 108, 110. Each component may be operatively connected to a rendering engine 112, 114, 116, respectively, each of which generates instructions for causing the components 106, 108, 110 to ultimately be rendered on the user's client machine 102 as a component representation 118. There may be a one-to-one mapping between a component on the server and its component representation on the client. For example, component representations 120, 122 and 124 may correspond to components 106, 108 and 110, respectively. Often, the type of instructions that the rendering engines 112, 114, 116 produce will depend on the type of computer language that the client machine 102 converses in. For example, some client machines may require instructions in XML, while others may communicate with HTML. According to the type of client machine 102 requesting a document from the server 100, a rendering engine may cause information from a component to be represented as a string of special characters 119, such as markup text language characters. Markup text includes but is not limited to HTML and XML. These character strings 119 are then transmitted via the network 104 to the client 102, where they are read by a browser 120. The browser 120 then reads the strings 119 and causes them to be rendered as component representations 118 on a display screen attached to the client 102.

Components 106, 108 and 110 may undergo state changes, as indicated by 106A, 108A, 110A. State changes may occur at either the client side or the server side. Some types of components, such as user interface components, can directly receive input from a user. A user interface typically comprises a junction between a user and a computer program. It may include a set of commands or menus through which a user communicates with a program. A command-driven interface is one in which the user enters commands. A menu-driven interface is one in which the user selects command choices from various menus displayed on a screen. Graphical user interfaces ("GUIs") may use windows, icons, and pop-up menus to simplify the process of interacting with a computer program from the perspective of a user. A software application's user interface sometimes constitutes one of the most important parts of a computer program because it determines how easily a user can interact with and control the program. When a Web page includes component representations that a user can interact with, rather than merely static information, the content on a page may undergo changes after the page and its component representations have been displayed to the user. Whenever the user interacts with a component representation in the server Web page, such as by manipulating data in a table or other type of user interface control, not only must the component representation be reflected on the users display, but the actual server-resident component must be updated to reflect the state changes resulting from this interaction. Components may also undergo state changes at the server side, absent user manipulation. For example, back-end business logic operating on the server machine may cause a component to change its state. These state changes also must be updated on the user display.

Coordination of state changes across the client-server architecture are often difficult to implement. Returning to FIG. 1, it can be seen that web applications that rely on fetching from the server then re-rendering an entire document upon every significant user event will cause the entire Web page to be re-rendered every time that browser 120 receives a string 118 reflecting user interaction with a user interface component. Also, component state changes caused by server side logic generally cannot be reflected in the client side component representation asynchronously. In other words, even though a component state may change at the server side, its representation at the client side often cannot be updated until a user event, or user interaction with the component causing communication back to the server, occurs. Network latency and inherent rendering time can cause even the simplest updates to a user interface to generate significant inefficiencies and delays. In the case of server side component state changes, updates may be significantly delayed pending user input to induce an update. Thus, the ability to render an updated document-based user interface component representation without re-rendering the entire document or Web page would significantly improve update time and the overall user experience.

Within a computer, information is often organized as a set of "objects," which will be explained in further detail below. When transmitted, the set of objects is sent as a "document." A document object model comprises a specification establishing a common way for programmers to access a document as a set of objects. One example of a document object model is the W3C DOM specification, which is being developed by the World Wide Web Consortium ("W3C") and defines a model for document objects. The W3C DOM comprises a platform-neutral and language-neutral interface that allows software programs and scripts to dynamically access and update the content, structure and style of documents such as Web pages and the like. The W3C DOM comprises a standard set of objects for representing HTML and XML documents, a standard model of how these objects can be combined, and a standard interface for accessing and manipulating them. Even after it is presented, a document can be further processed and the results of that processing can be incorporated back into the presented page, using the DOM. Software vendors can support any defined document object model, whether the W3C DOM or another model, as an interface to their proprietary data structures and application program interfaces ("APIs"). Content authors, such as Web programmers, can write to the standard document object model interfaces rather than to the product-specific APIs of particular vendors. This increases interoperability of independently created applications and documents on the Web. The W3C DOM is only one example of a document object model. A document object model may also include specifications for other types of mark-up languages and objects. It is to be understood that the term "document object model" as used herein is not intended to be limited to the W3C DOM or to refer only to HTML and XML.

As explained above, "DHTML" refers to Web content that changes while it is viewed. Through the use of JavaScript, DHTML can handle certain types of user interactions locally without requiring communication of with the server to process state changes. For example, a button component representation can change color when the user moves a mouse pointing device over the button.

DHTML typically relies on a document object model, which as explained above may be a platform- and language-neutral interface that allows programs and scripts to dynamically access and update the content, structure and style of documents. The document can be further processed and the results of that processing can be incorporated back into the presented page. The document object module may be used according to the teachings herein to dynamically change the appearance of Web pages after they have been downloaded to a user's browser. A document object model may define what attributes are associated with each object, and how the objects and attributes can be manipulated. The term "object" as used herein refers generally to any software-based item that can be individually selected and manipulated within a software application. Objects may include shapes and pictures that appear on a display screen and comprise the user interface of a software application, various types of controls, and less user-tangible software entities that may comprise other business logic within the software application. In object-oriented programming, for example, an object may be a self-contained entity that comprises both data and procedures to manipulate the data. Thus, a document object model may comprise a specification for how objects including, but not limited to, text, images, headers, or links are represented in a Web page.

The term "attribute" refers generally to a language construct that programmers use to add additional information (e.g. metadata) to code elements. This additional information may extend the functionality of code elements such as assemblies, modules, members, types, return values and parameters.

In accordance with the teachings herein, document based user interface objects may be programmed in any of a number of currently known languages or other languages to be developed in the future. While the specification may refer to Java and JavaServer Faces as an exemplary language and framework for constructing objects for use with the teachings herein, it is to be understood that other languages and frameworks are also applicable, and that the particular examples disclosed herein are referenced for illustrative purposes only. Java is a high-level object-oriented language that may be considered similar to C++, but simplified to eliminate language features that have resulted in common programming errors. As such, Java is an example of a general purpose programming language with a number of features that make the language well suited for use on the World Wide Web. Small Java applications are sometimes called Java "applets" and can be downloaded from a Web server to run on a local computer by a Java-compatible browser. As explained above, "components" are small binary objects or programs that perform a specific function and are designed in such a way to easily operate with other components and applications. Java source code files (files with a .java extension) may be compiled into a format called bytecode (files with a class extension), which can then be executed by a Java interpreter. Compiled Java code can run on many computers because Java interpreters and runtime environments, known as Java Virtual Machines ("VMs"), exist for many operating systems, including UNIX, the Macintosh OS, and Windows. Bytecode can also be converted directly into machine language instructions by a just-in-time ("JIT") compiler.

JavaServer Faces ("JSF") comprises a framework for building Web-based user interfaces in the Java programming language. JSF provides a set of standard components, such as buttons, hyperlinks, checkboxes, and the like, that may be represented in a document. JSF also provides a facility for creating custom components, and the functionality to process client-generated events such as those that result when a user changes the value in a text box or clicks on a button in a user interface component. Through the use of specialized libraries called "RenderKits," which translate each component into mark-up language, JSF allows component representations to be displayed on a variety of target clients when it knows the mark-up dialect of those clients. For example, if it is known that a target client communicates in HTML, a JSF component can operate by rendering itself in HTML for that target client if an appropriate HTML RenderKit is associated with the component. The same JSF component could also render itself in XML, if it were informed that the target client communicates in XML, and if an appropriate XML RenderKit were associated with the component.

JSF comprises a technology that includes a set of APIs and a JavaServer Pages (JSP) custom tag library. The APIs function to represent user interface components, manage their state, handle events and input validation, define page navigation, and support internationalization and accessibility. The custom tag library provides developers with the ability to express a JavaServer Faces interface within a JSP page. In accordance with the teachings herein, document based user interface components may comprise JSF components, but are not limited to JSF. The novel concepts disclosed herein are applicable to other frameworks as well, and any reference made herein to JSF is for illustrative purposes only.

Figure 2:
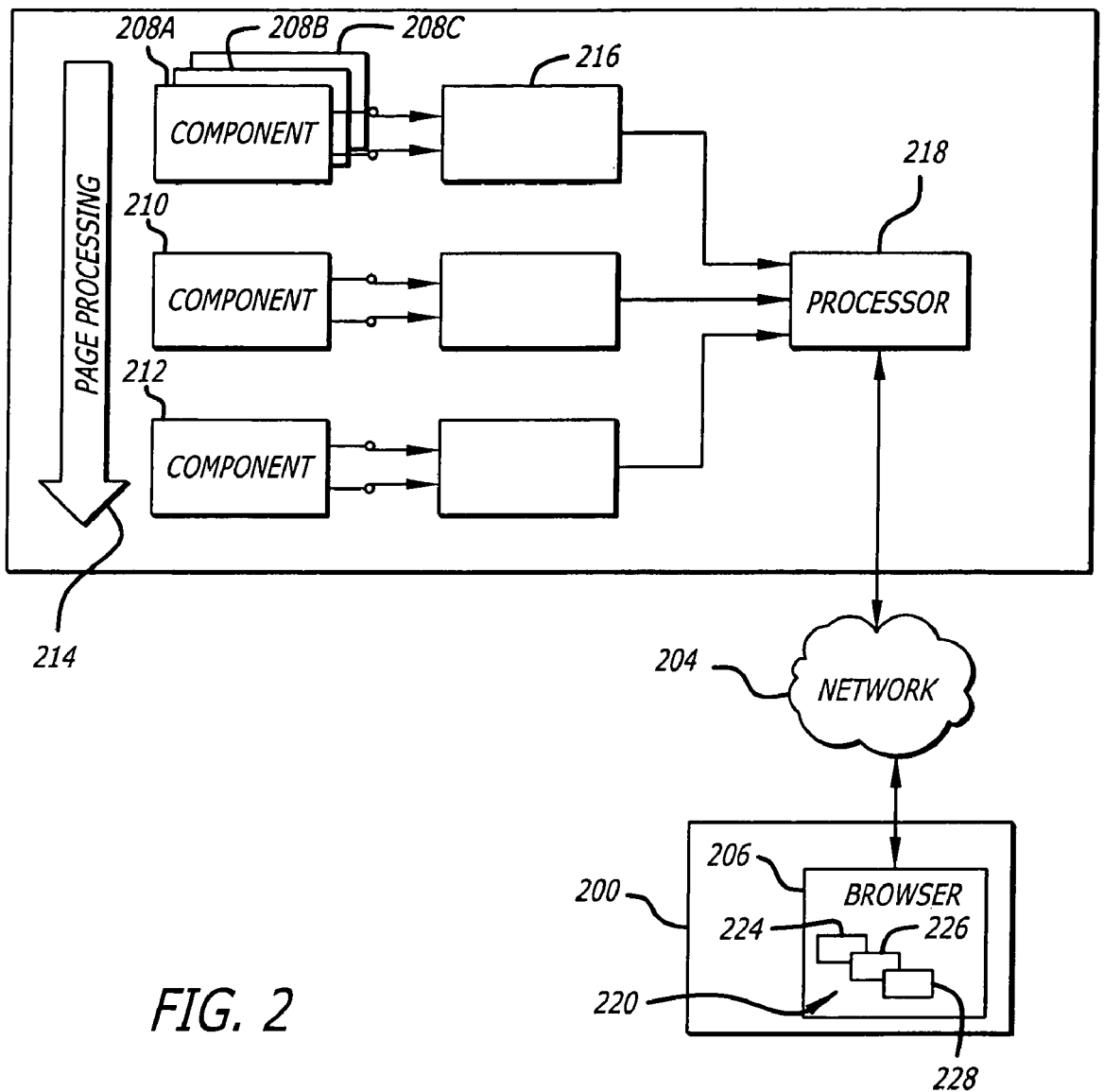
FIG. 2 is a conceptual block diagram illustrating a system for rendering a document-based user interface software object in a document object model.

FIG. 2 is a conceptual block diagram illustrating a system for rendering a document-based user interface software object in a document object model, whereby delays and inefficiencies experienced in many prior art systems may be significantly reduced. A user at a first computer 200 may access a document stored on a remote computer 202 over a communications network 204. The computers may be part of a network, such as a client-server network. A client-server architecture is a network architecture in which each computer or process on the network comprises either a client or a server. A server is generally a computer or device on a network that provides information to a client. Typically, clients are devices that make requests for information, and servers are devices that respond to the requests with information. For example, servers can be configured to manage network resources by handling resource requests. Often, servers are powerful computers or processors dedicated to managing disk drives (file servers), printers (print servers), network traffic (network servers), or information resources. For example, a file server may be a computer and storage device dedicated to storing files. Any user on the network can store files on the server. A print server may be a computer that manages one or more printers, and a network server is a computer that manages network traffic. A database server may be a computer system that processes database queries. Servers are often dedicated, meaning that they perform no other tasks besides their server tasks. On multiprocessing operating systems, however, a single computer can execute several programs at once. A server in this case could refer to the program that is managing resources rather than the entire computer. Though servers are often used to manage resources as described above, a server may be any type of machine or device that handles requests from clients, and is not necessarily a machine dedicated to managing resources. Moreover, servers need not be larger or more powerful than clients. As used herein, the term "server" refers to any type of machine or device that responds to requests.

Clients, on the other hand, usually include PCs or workstations on which users run applications. Clients may rely on servers for resources, such as files, devices, and even processing power. More generally, a client may be a device or machine that relies on a server to perform some operations, or that queries a server for information. A client may even be an application that runs on a machine and relies on a server to perform some operations. For example, an e-mail client is an application that enables you to send and receive e-mail. A computer network that includes a server and a client in communication with one another is often called client-server architecture. Another type of network architecture is known as a peer-to-peer architecture because each node in the network has equivalent responsibilities. In addition to the various examples of clients just described, a client may include any device that makes requests to another machine or device. Thus, as used herein the term "client" refers to any type of machine or device that makes requests As will be recognized by those skilled in the art, various aspects of the teachings herein may apply to both client-server architectures and peer-to-peer architectures.

Returning now to a description of FIG. 2, first computer 200 may comprise a client, remote computer 202 may comprise a server or a second client, and communications network 204 may comprise the Internet. Through a browser 206 operated on the user's computer 200, the user may request a document that includes one or more components 208, 210, 212. Each component of the document must eventually be represented to the user during page processing, which is indicated by arrow 214. Component 208 is shown at various stages 208A, 208B, 208C, which may occur at either the client side or server side. As explained above, the difference in each stage of component 208 may be caused by a user event, initiated by input from the user interacting with component 208 to change its state, or by logic implemented at the server side. For example, component 208 may comprise a table, and may reflect different data values at each of its states 208A, 208B and 208C if the user interacts with the table to alter, add or delete the data therein. Alternatively, business logic operating on the server may induce updates to component 208, causing state changes which are represented by states 208A, 208B, 208C. State changes within a single component may occur after initial rendering of all components The updating of component 208 to reflect its various states that are caused by user interaction or server side logic will be described in further detail below.

When the document is first retrieved by browser 206, it may be represented in the remote computer's document object model 216. As will be understood by those skilled in the art, this may be accomplished, for example, by adding the document or a component within the document to the remote computer's document object model, so that it may be rendered on a display screen connected to the user's computer 200. A processor 218 may then serialize the document object model, or translate it into computer readable characters that can be communicated across network 204 to the user's computer 200. The serialized document object model may comprise an HTML string, an XML string, or other computer readable characters. When browser 206 receives the serialized document object model, it may interpret the string and render the page including components 208, 210, 212, which are displayed to the user as component representations 220. As described above, component representations 220 may have one-to-one correspondence to components on the server. For example each component representation 222, 224, 226 may correspond to components 208, 210, 212, respectively.

At of the completion of initial page processing, the user may interact with one of components 208, 210, 212 via their component representations 220 at the client side. For example, a component may comprise a document-based user interface object, such as a table, a data entry box, or other type of user interface control. As the user interacts with the component representation from his computer 200, signals indicating user events are transmitted via network to remote computer 202. The signals cause a change in the state of component 208, so that it may comprise updated information entered by the user. As described above, state changes may also be caused by server side logic, absent user interaction at the client side. Various states of component 208 are indicated by original component 208A and user-updated components 208B and 208C. Each time component 208 is changed, either by a user event, by server side logic, by a user event that triggers server-driven state changes, or by other mechanisms, the changed component may be represented in the remote computer's document object model 216. The updated document object model may then be translated into computer readable characters by processor 218 as described above, and sent across communications network 204 to the user's browser 206 where it may be interpreted and rendered.

Figure 3A:
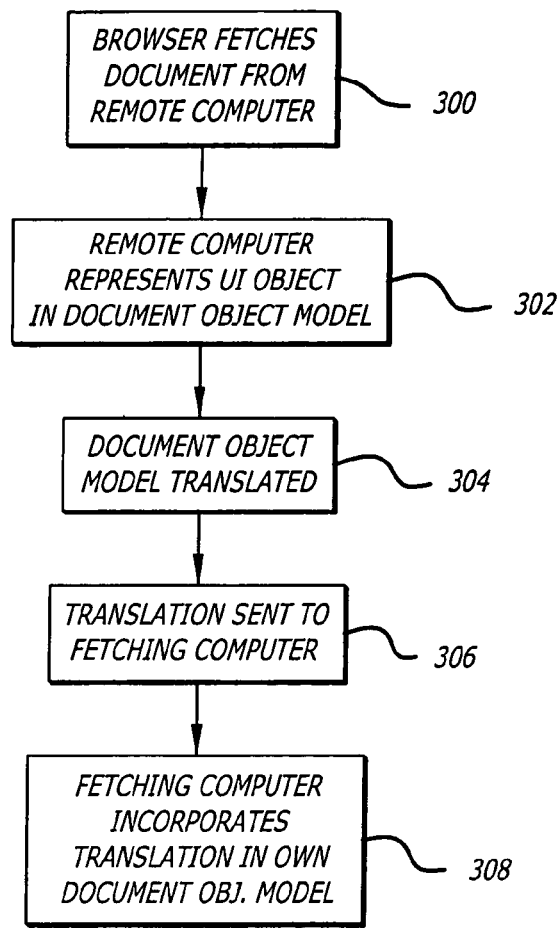
FIG. 3A is a flowchart illustrating a method of rendering a document-based user interface software object in a document object model.

FIG. 3A is a flowchart illustrating a method of rendering a document-based user interface software object in a document object model. This and other methods may be implemented by the exemplary system described above. At block 300, the user may request a document such as a Web page from a remote computer. The request may then be implemented by a browser operable on the user's local computer. The requested document may include a document-based user interface object. At block 302, the remote computer may represent the document-based user interface object in the remote computer's document object model. At block 304, the remote computer's document object model, which now includes information representing the document-based user interface object, may be translated into computer readable characters such as HTML, XML or other mark-up language. The computer readable characters may then be sent to the user's computer at block 306, and at block 308 the user's computer may incorporate the transmitted computer readable characters into its own document object model. Through this process, the document-based user interface object may be rendered and displayed by the user's browser on a display screen operatively connected to the user's computer. As the user interacts with the document-based user interface object, and causes changes in the object by doing so, those changes may be reflected in the remote computer's document object model before transmission to the user's computer. Using this method eliminates the need to re-process the entire page and recreate the document object model, when the state of a single object changes.

Figure 3B:
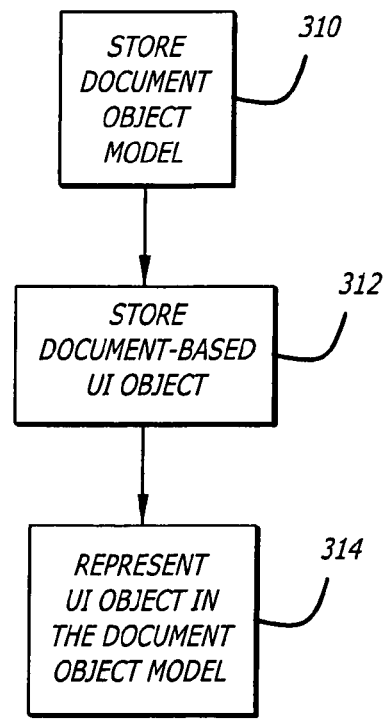
FIG. 3B is a flowchart illustrating one aspect of rendering a document-based user interface software object in a document object model.

FIG. 3B is a flowchart illustrating one aspect of rendering a document-based user interface software object in a document object model. In order to render a document-based user interface software object in a document object model, the document object model should reside on a computer on which the document-based user interface object is also stored. Thus, the computer may have a memory system for storing both the document-based user interface object, and data that describe the document object model, as indicated at block 310. Those skilled in the art will recognize suitable types of memory systems for storing such data. The same memory system, or a different memory system that is also in communication with the computer, may store the software code which describes the document-based user interface object. This is indicated at block 312. Finally, at block 314, the document-based user interface object may be represented in the document object model on the computer.

Figure 4:
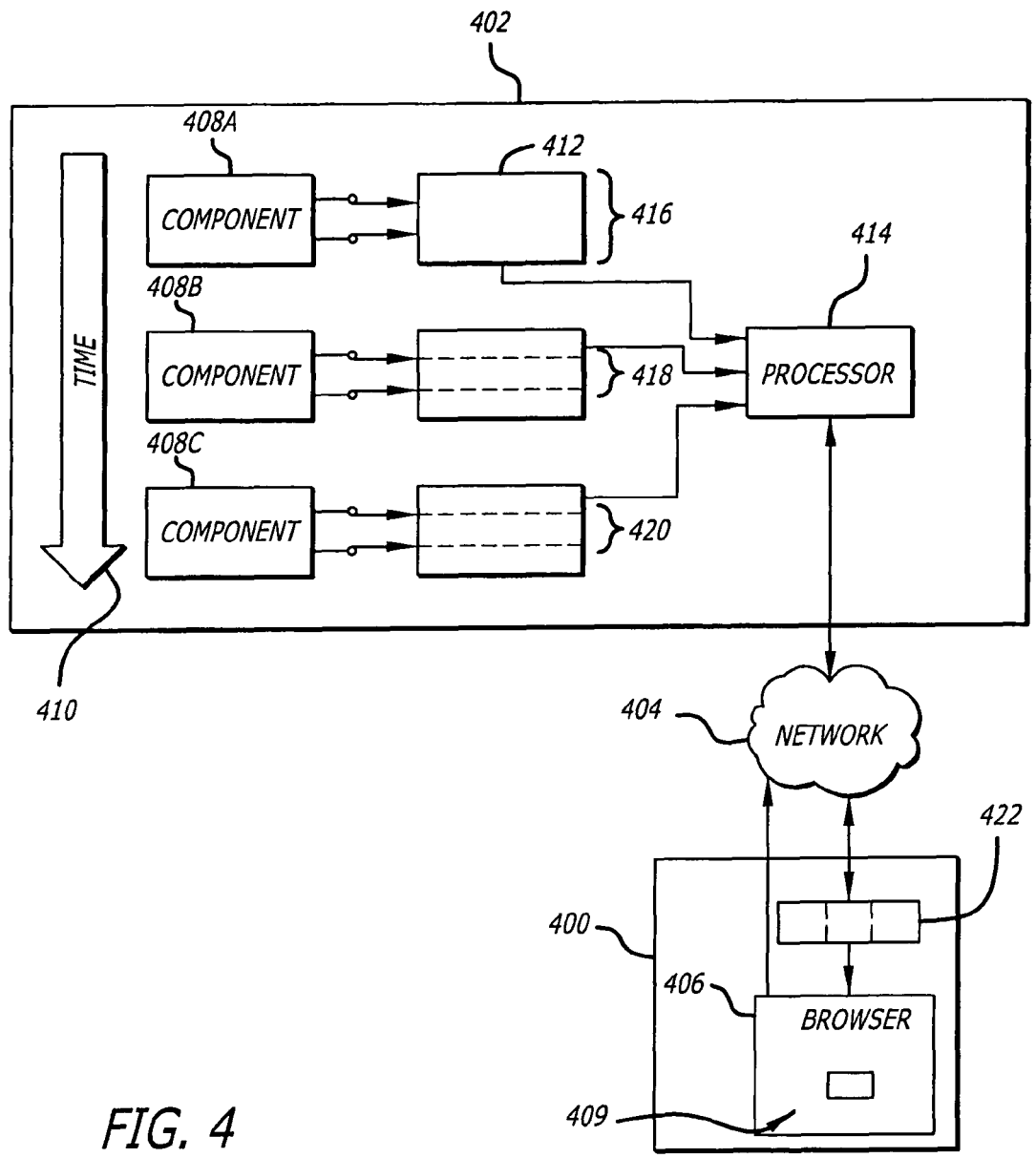
FIG. 4 is a conceptual block diagram illustrating a system for updating a document object model to reflect changes caused by the rendering of a document-based user interface software object therein.

FIG. 4 is a conceptual block diagram illustrating a system for updating a document object model to reflect changes caused by the rendering of a document-based user interface software object therein. A user at a first computer 400 may access a document stored on a remote computer 402 over a communications network 404. First computer 400 may comprise a client, remote computer 402 may comprise a server or a second client, and communications network 404 may comprise the Internet. Through a browser 406 operated on the user's computer 400, the user may request a document that includes a component representation 409 of component 408. Component 408 is shown at various stages 408A, 408B, 408C, which may occur during user interaction with the component representation of component 408, or from logic enacted at the server side. While a document is displayed to a user, these state changes may occur over time, as indicated by time arrow 410. The difference in each stage of component 408 may be caused by a user event or server side logic, as explained above with respect to FIG. 2 and in further detail below.

When the document is first retrieved by browser 406, it may be represented in the remote computer's document object model 412. A processor 414 may then serialize the document object model representation, indicated at 416, by translating it into computer readable characters that can be communicated across network 404 to the user's computer 400. The serialized document object model 416 may comprise an HTML string, an XML string, or other computer readable characters. When browser 406 receives the serialized document object model, it may interpret the string, create its own document object model 422, and render the page including component 408.

After initial page processing the user may interact with component 408. For example, the component may comprise a document-based user interface object, such as a table, a data entry box, or other type of user interface. As the user interacts with the component representation from his computer 400, signals indicating user events may be transmitted via network to remote computer 402. The signals may cause a change in the state of component 408, so that the component includes updated information entered by the user. As explained above, state changes may be caused by server side logic, absent user interaction, as well. Various states are indicated by original component 408A and user-updated components 408B and 408C. In this alternative embodiment, each time component 408 is changed by a user event or server side logic, the change in the component may be represented in the remote computer's document object model 412. The representations of these changes are indicated at regions 418 and 420. Thus, a user event which causes component 408 to change from state 408A to state 408B will also cause the change 418 to document object model 412. Likewise, a subsequent user event which causes component 408 to change from state 408B to state 408C will also cause the change 420 to document object model 412. At this point, instead of translating the entire document object model, the updated portion of the document object model may then translated into computer readable characters by processor 414. The translated update may be sent across communications network 404 to the user's browser 406 where it may be interpreted, added to the client document object model 422, and rendered. Therefore, this alternative embodiment processes only changes to the document object model in remote computer 402, and sends only the changed portions of the document object model to the user's computer 400 to be rendered by browser 406. The client may also interpret the incremental state changes, and incorporate them into the client's document object model 422.

Figure 5:
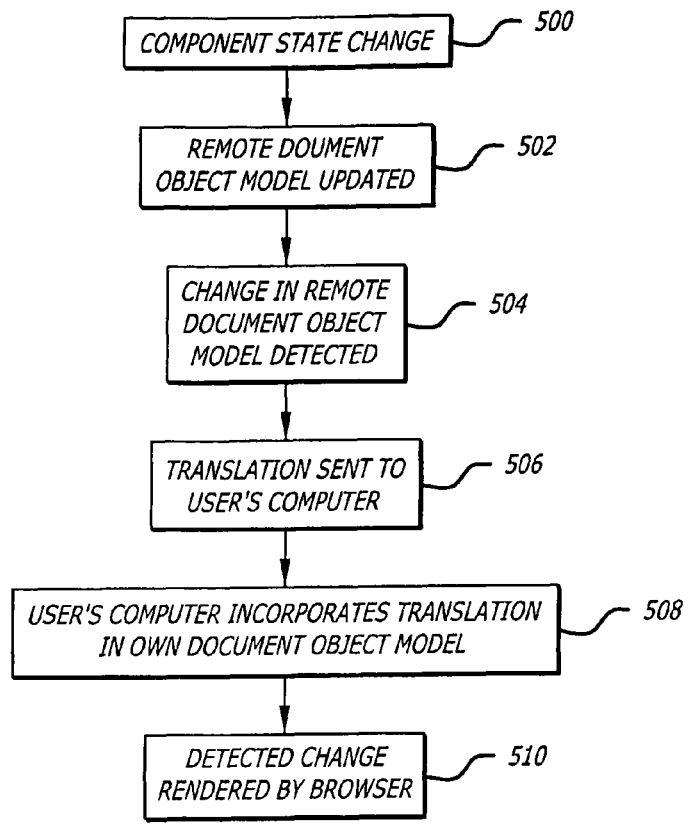
FIG. 5 is a flowchart illustrating a method of updating a document object model to reflect changes caused by the rendering of a document-based user interface software object therein.

FIG. 5 is a flowchart illustrating a method of updating a document object model to reflect changes caused by the rendering of a document-based user interface software object therein. As discussed above, a user may interact with the document-based user interface object, or server side business logic may be implemented, causing a user event that changes the state of the component. This component state change, whether implemented by client side user interaction or server side logic, is depicted at block 500. A signal representing the user event is transmitted from the user's computer to a remote computer, such as a server, where the document containing the component resides. At block 502, the document object model on the remote computer may be updated to represent the change which occurs in the user interface object due to the user interaction. At block 504, the change in the document object model may be detected. The change constitutes the difference in the component between its state prior to the user interaction and after the user interaction. The change may be detected at the client by comparing two versions of the document object model, by marking the document at the server to indicate the changes, or by other methods that will be apparent to those skilled in the art. The detected change may be translated to computer readable characters, such as an HTML or XML string, which may be sent to the user's computer at block 506. At block 508, a browser or other software running on the user's computer may incorporate the translated change into its own document object. The browser may then render the updated portion of the document-based user interface object as indicated at block 510, and enable it to be displayed in its new state to the user, without having re-rendered the entire document.

Figure 6:
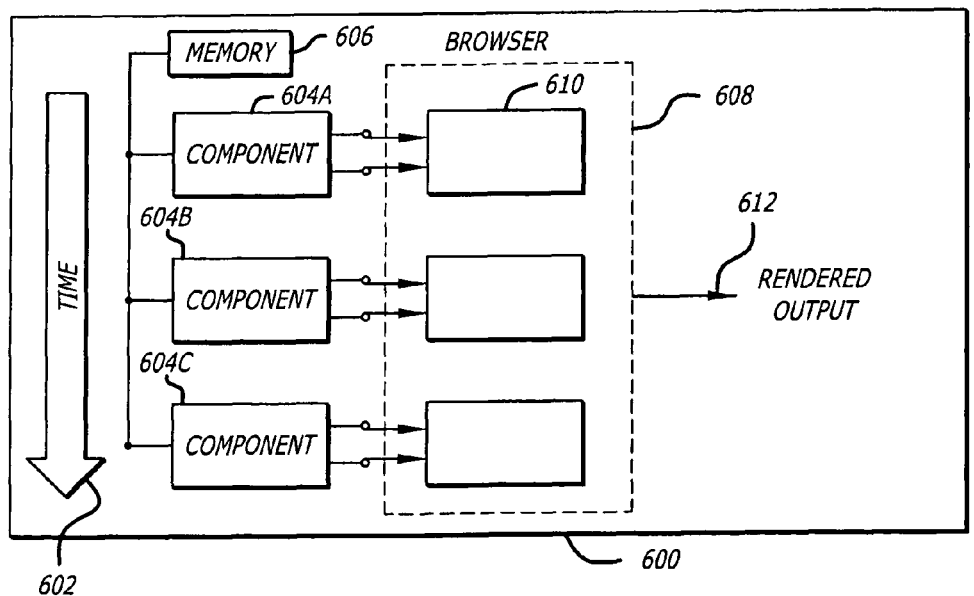
FIG. 6 is a conceptual block diagram illustrating implementation of a location-neutral software user interface object.

FIG. 6 is a conceptual block diagram illustrating implementation of a location-neutral software user interface object. In an exemplary embodiment, the location-neutral software user interface object may comprise a JSF object, though it is to be understood that the teachings herein are not limited to use with JSF. Typically, JSF components operate on a server system, which usually has larger storage and processing capacities than a client system. JSF components have traditionally required a robust JSF "container" that includes software-based capabilities to support JSF components. Because of the amount of support a JSF component might require, the JSF container is quite large, resulting in the traditional need of a server-type machine for its storage and operation. In an exemplary embodiment of the systems taught herein, a JSF container may be constructed to be smaller and require less storage capacity. In the exemplary embodiment, illustrated in FIG. 6, a client-side JSF container having only certain capabilities of a traditional server-side JSF container may be developed and stored on a client system, thus enabling JSF components to operate locally on a client machine.

When the client-side JSF container of the exemplary embodiment is included on a client computer 600, JSF document-based user interface components may be directly rendered in the client's document object model without the need to interact or communicate with a remote computer. Additionally, it is unnecessary to serialize the component representation to computer readable characters. Instead the rendering can occur directly into the client document object mode. Over time, indicated by arrow 602, a user may interact with the component representation and a component representation of component 604 within that page may change states initiated by user events. Component 604 may also change states due to logic operations at the server side, as described above. Various states of component 604 are illustrated at 604A, 604B and 604C. The components may be supported by a JSF client-side container, stored in memory 606 on the client computer 600. A browser 608 may be resident and operable on the client computer 600. When component state changes occur, whether by user interaction or server side logic, the component in its new state may be rendered directly into the client computer's document object model 610. The browser may then render the component and produce output 612, so that the component may be displayed to the user even as it evolves, through the user's interaction with it or through changes invoked at the server side, as indicated by time arrow 602.

In the exemplary embodiment, some features of the novel client container that are not present in the traditional server container may exclude support for JSP compilation, support for HTTP serving, and include simplified threading and security, and direct collection and control of user input by a controller on the client rather than a through communication with a servlet on the server. Threading and security may be simplified in the novel client container because clients typically do not experience the high volume of requests that servers are designed to handle. Such requests may flow from users and other computers, and will therefore not be prevalent on a client computer that is being operated in a local environment by a single user.

Because the novel client-side container of the exemplary embodiment may be stored and operated on either a client system and provide an identical containment environment to the server-based container, software developers will not need to know at the time of development where the component will ultimate reside. Prior to conceiving the systems taught herein, developing a component often required knowledge of whether that component would need to operate on a server or on a client. Depending on which type of system the component was designed for, the code implementing that component could be very different. However, the exemplary embodiment, including a client-side container that duplicates the server-side containment environment, and that can be supported by a client system, enables software developers to create components without regard to which type of computer system the components will ultimately run on. This is because the component, no matter how it is coded by the software developer, can be supported by the novel client-side container, or the server-side container.

Figure 7:
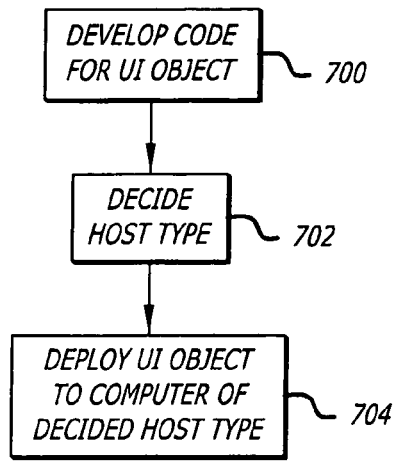
FIG. 7 is a flowchart illustrating a method of developing and implementing a location-neutral software user interface object.

FIG. 7 is a flowchart illustrating a method of developing and implementing a location-neutral document object model-based software user interface object. This type of software user interface object is capable of being supported by both a client and a server, and is not limited to deployment on either type of machine or device. Also, this type of software user interface object may be rendered by being represented in a document object model on whatever computer or device it is deployed on. At block 700, a software developer may write code to describe a document-based user interface object. This development is performed without regard to what kind of computer the object will ultimately be deployed on. The resultant document-based user interface object will be capable of being supported on either a client system or a server system. After the object is developed, a decision may be made regarding which type of computer it will reside on: client or server. This decision is indicated at block 702. Then, at block 704, the document-based user interface object is deployed on the computer of the selected type.

Figure 8:
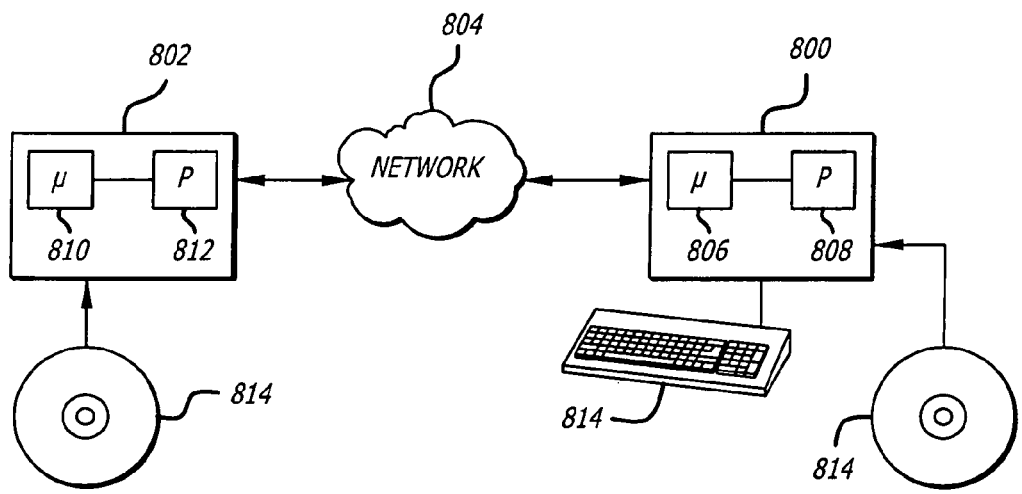
FIG. 8 illustrates an exemplary distributed computer system in which the various methods, systems and computer-readable media disclosed herein may be practiced.

FIG. 8 illustrates an exemplary distributed computer system with which the various methods, systems and computer-readable media disclosed herein may be practiced. A first computer 800 may be communicatively connected to a second computer 802 through a communications network 804 such as the Internet. First computer 800 may comprise a client system or a server system, and may include a memory system 806 and a processor 808. Second computer 802 may also comprise a client system or a server system, and may also include a memory system 810 and a processor 812. A user input device 814 may be communicatively connected to the first computer 800 to allow a user to interact with document-based user interface components that are resident on the computer's memory system 806. These interactions may be handled by processors 808 and 810 according to the methods described herein. Of course, some embodiments disclosed herein enable the user interactions to be handled by processor 808 alone. The methods disclosed herein may be stored on computer-readable media 816 in the form of instructions executable by a computer to perform the methods.

The previous description of the disclosed embodiments is provided to enable any person skilled in the art to make or use the teachings herein. Various modifications to these embodiments will be readily apparent to those skilled in the art, and the generic principles defined herein may be applied to other embodiments without departing from the spirit or scope of the teachings disclosed herein. Thus, the scope of the disclosures herein is not intended to be limited to the embodiments shown and described, but is to be accorded the widest scope consistent with the general principles and novel features disclosed herein.

What is claimed is:

1. A computer server system comprising:
a memory server system configured to include an original document object model that comprises a data structure for representing documents on the computer server system; and
a processing server system configured to communicate with the memory server system and with a client computing system comprising a duplicate copy of the original document object model and the processing server system is configured to implement the steps of:
receive information from the client computing system, the information representing a change in a state of a software component of the original document object model;
update portions of the original document object model based on the change;
translate only the updated portions of the original document object model into a mark-up language string; and
transmit the string to the client computing system for incorporation into the duplicate copy of the original document object model.

2. The computer system of claim 1 wherein the original document object model comprises HTML code.

3. The computer system of claim 1 wherein the original document object model comprises XML code.

4. The computer system of claim 1, wherein the original document object model represents a software object that implements a user interface object.

5. The computer system of claim 1, wherein the information from the client computing system comprises a form that represents a user interaction with a software component of the duplicate copy.

6. A server comprising:
a memory configured to store a document object model comprising a data structure for representing documents on the server; and
a processor configured to:
receive information from a client representing a change in a state of a software component of the document object model;
change portions of the document object model to reflect the change in the state of the software component;
translate only the changed portions of the document object model into a string; and
communicate the string to the client for incorporation into a document object model in the client.

7. The server of claim 6, wherein the information represents the change in state of the software component in response to user interaction with the software component at the client.

8. The server of claim 6, wherein the processor is further configured to communicate the change to the document object model by communicating a difference between the document object model before its change and the document object model after its change.

9. The server of claim 8, wherein the processor is further configured to determine the difference by comparing the document object model before its change to the document object model after its change.

10. The server of claim 6, wherein the processor is further configured to communicate the change to the document object model by translating the change to the document object model to a markup language and transmitting the markup language to the client.

11. The server of claim 10, wherein the markup language comprises HTML code.

12. The server of claim 10, wherein the markup language comprises XML code.

* * * * *